United States Patent Office 3,584,095
Patented June 8, 1971

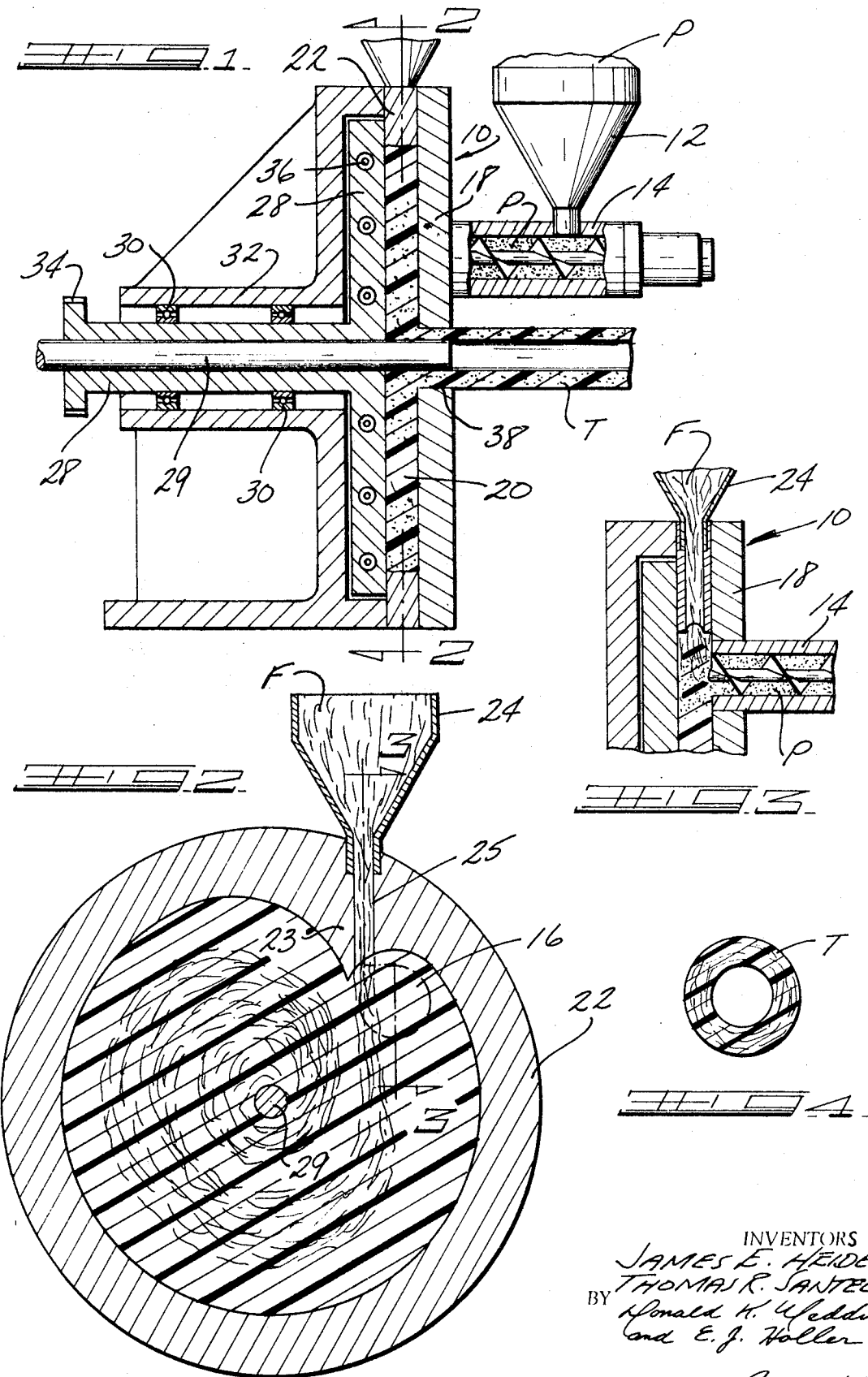

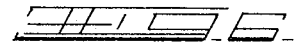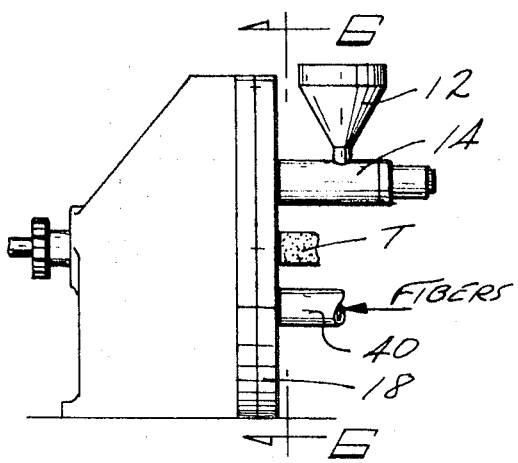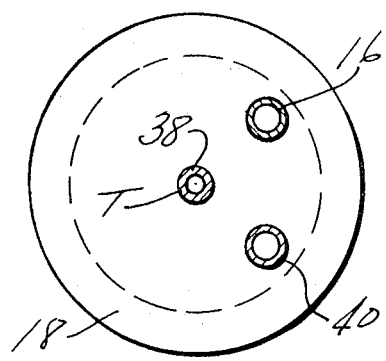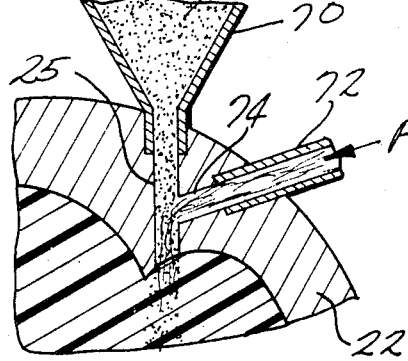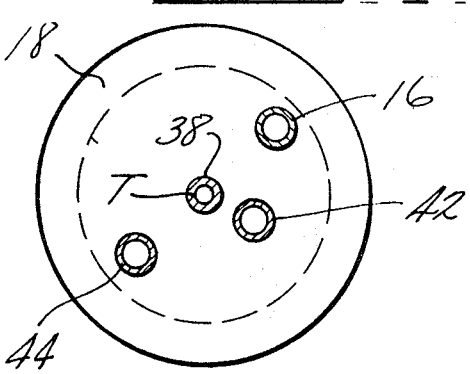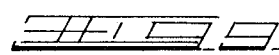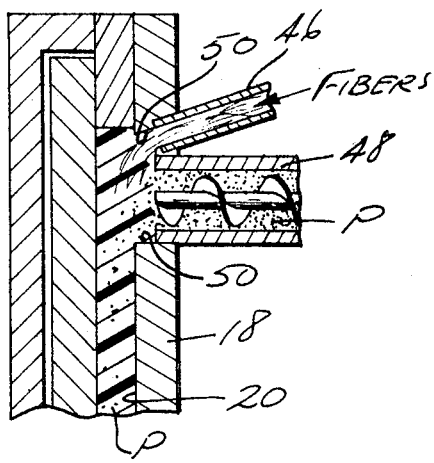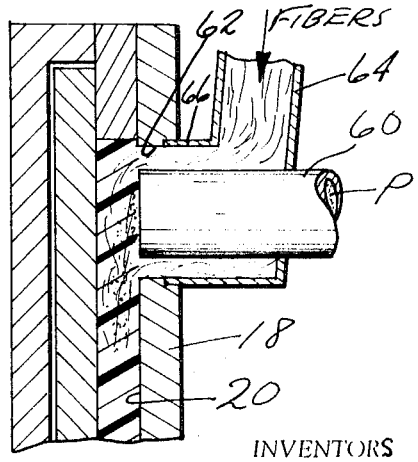

3,584,095
PROCESS FOR EXTRUDING PRODUCTS REINFORCED BY ELONGATED CONTINUOUS FIBERS
James E. Heider, Toledo, and Thomas R. Santelli, Sylvania, Ohio, assignors to Owens-Illinois, Inc.
Division and continuation of application Ser. No. 649,773, May 22, 1967, now Patent No. 3,429,003, which is a continuation-in-part of application Ser. No. 560,355, May 13, 1966, which in turn is a continuation of application Ser. No. 422,191, Jan. 4, 1965. This application Nov. 13, 1968, Ser. No. 775,436
Int. Cl. B29d 3/02
U.S. Cl. 264—108                      7 Claims

ABSTRACT OF THE DISCLOSURE

There is disclosed a process for reinforcing extruded members simultaneously with the extrusion thereof which comprises introducing elongated reinforcing members to the melt chamber of a centripetal extruder having a melt chamber and a rotating member such that the reinforcing members are spirally swept with the substance to be extruded and are ultimately positioned in a spiral arrangement through the extruded product. The reinforcing members may be introduced into the melt chamber via the same inlet passage employed for feeding the substance to be extruded. Additionally or alternatively, the reinforcing members may be introduced into the melt chamber by one or more additional inlet passages suitably positioned either laterally or peripherally with respect to the melt chamber.

RELATED APPLICATIONS

This application is a division (and continuation) of copending U.S. application Ser. No. 649,773, filed May 22, 1967, now Pat. No. 3,429,003, which is a continuation-in-part of copending U.S. application Ser. No. 560,355 filed May 13, 1966, which is a continuation of abandoned U.S. application Ser. No. 422,191 filed Jan. 4, 1965.

SUMMARY OF OBJECTS AND INVENTION

This invention relates to a process for reinforcing extruded members simultaneously with the extrusion thereof and more particularly to a process for manufacturing fiber-reinforced extrudates such as piping, tubing, rods, gobs, pellets, parisons, etc., wherein the fibers are continuously fed and are oriented.

It is known in the art to use an extrusion process employing a screw-type extruder to extrude a mixture or blend of fibers, such as glass, and plastic materials. However, such a process typically results in the fibers being chopped or severed into small pieces due to the shearing action of the tight fitting screw and barrel. As a result, the effectiveness of long fibers for purposes of reinforcements has been greatly reduced. In addition, it is noted that extreme wear of the extruder screw and barrel takes place. Other extruding means such as a simple heating cylinder and transfer plunger to force the hot plastic through a die are objectionable due to the slowness and intermittent nature of the operation.

In accordance with this invention, there is provided an improved process for reinforcing extruded products with elongated fibers or similar reinforcing members wherein the reinforcing fibers are not fractured or severed during the extrusion, but rather are maintained in substantially uninterrupted condition and wherein there is obviated the above-noted problem of excessive wear due to abrasive action of short fibers. More particularly, in accordance with this invention, there is provided a process which is rapid and efficient, and wherein the fibers are continuously fed and oriented around the extruded product in substantially uninterrupted condition.

The aforementioned as well as other advantages are achieved by feeding elongated reinforcing members into the melt chamber of a centripetal extruder such that the reinforcing members are spirally swept with the material to be extruded and are ultimately positioned in the extruded product in a continuous and spiral arrangement. The reinforcing members may be introduced into the melt chamber via the same inlet passage employed for feeding the substance to be extruded. Additionally or alternatively, the reinforcing members may be introduced into the melt chamber by one or more additional inlet passages suitably positioned either laterally or peripherally with respect to the melt chamber.

In further explanation of the invention, reference is made to the accompanying drawings in which:

FIG. 1 is a schematic side elevation partly in section of novel apparatus constituting one embodiment of this invention;

FIG. 2 is a transverse section along line 2—2 of FIG. 1;

FIG. 3 is a fragmentary transverse section along line 3—3 of FIG. 2;

FIG. 4 is a transverse section of the tubing produced by the apparatus of this invention;

FIG. 5 is a schematic side elevational view of an extruder illustrating a modification of the present invention;

FIG. 6 is a cross-sectional view taken generally along lines 6—6 of FIG. 5;

FIG. 7 is a view similar to FIG. 6 except illustrating a further modification of the invention;

FIG. 8 is a fragmental, cross-sectional view of an extruder illustrating yet another modification of the present invention;

FIG. 9 is a fragmental, cross-sectional view illustrating still another modification of the present invention: and FIG. 10 is a fragmental, cross-sectional view similar to FIG. 2 but illustrating yet another modification of the present invention.

It is to be noted that while this invention can be used to produce many types of extrudates, the disclosure specifically discusses the manufacture of plastic tubing.

Like reference characters designate corresponding parts in the several figures of the drawings, where as illustrated in FIG. 1, 10 designates a centripetal extruder constituting one embodiment of the invention, provided with a hopper 12. The plastic material P is fed by a worm mechanism 14 through an opening 16 in the stationary wall or plate 18 which leads laterally into melt chamber 20 of extruder 10. The melt chamber 20 is bounded by a gap plate 22 at whose upper end is a hopper 24 for the peripheral continuous introduction of reinforcing fibers F (FIGS. 2 and 3) by means of channel 25 into melt chamber 20. The gap plate 22 has a projection 23 which extends into melt chamber 20.

The centripetal extruder 10 is provided with a cylindrical rotor member 26 which is attached to a shaft 28. The shaft 28, which has a non-rotatable mandrel 29 in the center thereof, is mounted in suitable bearings 30 in the casing 32 and is constantly rotated by a motor (not shown) through gear 34. Heating elements 36 are provided in rotor member 26 to heat the plastic material P to a temperature which will give it the desired fluidity for extrusion.

In operation, plastic material P, such as pellets, are fed from hopper 12 by worm 14 through lateral opening 16 into melt chamber 20. Simultaneously, fibers F, such as glass, are continuously fed from hopper 24 by way of channel 25 and peripherally into melt chamber 20.

The heating element 36 is then turned on to melt the plastic material into a liquid mass. The motor (not shown) is then started and effects rotation of the shaft 28 and rotor 26. This rotation causes the liquid plastic in the melt chamber 20 to become sheared as is well known in the operation of centripetal extruders. The fibers F entering tangentially and peripherally of the chamber 20, are swept spirally or in a rotary manner toward the mandrel 29 (FIG. 2) without any appreciable breaking of the fibers. This rotary or spiral motion is facilitated or accentuated by member 23. As the rotational speed of member 28 is increased, the shearing stress is increased and a force normal to this stress is developed which is of such magnitude as to cause the fluid plastic material to be extruded through die opening 38, due to a centripetal pumping action, as a plastic tubing T which is characterized by having the glass fibers substantially continuous and intact and disposed or oriented around the diameter of the tube T as shown schematically in FIG. 4.

Within the concept of the invention, the reinforcing fibers may be fed into the melt chamber of the extruder from locations other than that described above. For example, as shown in the modification of FIGS. 5 and 6 the reinforcing fibers may be fed laterally into the melt chamber through inlet conduit 40 which communicates with the melt chamber at an area angularly spaced from inlet 16 through which the plastic material P to be extruded is fed. As shown in FIG. 6, conduit 40 may be at the same radial distance from the die opening 38 as inlet 16, or at a different radial distance as illustrated in the modification of FIG. 7. In the latter modification, two separate inlet conduits 42 and 44 are employed to laterally feed the reinforcing fibers into the melt chamber. Conduit 42 is positioned closer to die opening 38 than conduit 44 which may be at the same radial distance as that of inlet 16 as shown in FIG. 7 or at a different radial distance (not shown). Moreover additional inlets and other radial spacings (not shown) for introducing the reinforcing fibers into the extruder may be employed.

The present invention may also be practiced by introducing the reinforcing fibers and the plastic material to be extruded, into the extruder through means of a common inlet passage. In this regard, reference is now made to the three modifications of the invention shown in FIGS. 8, 9 and 10. In the FIG. 8 modification, the reinforcing fibers are fed laterally into the melt chamber by a conduit 46 which extends at an oblique angle relative to the conduit 48 which feeds the plastic material P. However, conduits 46 and 48 merge into a common conduit or passage 50 formed in extruder wall 18 in communication with the melt chamber.

In the modification of FIG. 9, the plastic to be extruded is fed laterally into the melt chamber 20 through conduit 60 which extends through an inlet passage 62 formed in end wall 18 in communication with the melt chamber. Inlet passage 62 has a larger diameter than conduit 60 so as to define an annular passage around conduit 60 communicating with melt chamber. The reinforcing fibers are introduced into the melt chamber by means of this annular passage; the fibers being conveyed to the annular passage by suitable conduit shown as an angular conduit 64 having a laterally extending portion 66 fixed concentrically in passage 62.

In the modification of FIG. 10, the plastic substance P to be extruded is fed tangentially into the melt chamber by means of a hopper 27 communicating with passage 25 which leads into the melt chamber from the periphery of the extruder. The reinforcing fibers are fed into the melt chamber by means of a conduit 72 extending from the periphery of the extruder at an angle to passage 25. A passage 74 is formed in the extruder wall 22 to interconnect passage 25 and conduit 72. Thus, in the present modification, passage 25 is employed to feed both the plastic substance P and the reinforcing fibers, into the melt chamber.

From the foregoing description, it will be apparent that there has been devised a novel process for producing plastic members such as tubing (or pipe) in which the reinforcing fibers are not only oriented around the diameter of the tubing rather than lengthwise, but are substantially continuous thereby effecting a greater reinforcement of the tubing than short fiber reinforcement where actually the short fibers constitute nothing more than fill.

Various modifications of the present invention will be apparent to those skilled in the art. Although the preparation of plastic tubing or pipe has been illustrated, it is evident that the apparatus is equally adaptable to plastic rod by omitting mandrel 29. For certain applications, it may be desirable to use a fine gauge of wire instead of glass fibers. In addition, various plastic materials may be extruded such as polyethylene, polystyrene, and polypropylene.

While specific embodiments have been shown and described in detail to illustrate the present invention, it will be understood that the invention may be embodied otherwise without departing from such principles.

We claim:

1. A process for extruding products and the like while reinforcing the products with elongated reinforcing members and the like arranged about the axis of the products in substantially uninterrupted condition which process comprises: feeding the product material in a centripetal extruder, and continuously feeding the elongated members entering the centripetal extruder with the reinforcing members entering the centripetal extruder in substantially longitudinally extending orientation and in uninterrupted condition to be rotated with said product material and ultimately positioned spirally about the longitudinal axis of the product throughout the length of the product, the elongated reinforcing members being supplied to melt chamber from a source which is separate from the source of the product material.

2. The process of claim 1 wherein the reinforcing members are introduced generally tangentially with respect to the rotative direction of the rotary member and the flowable substance swept thereby in the melt chamber.

3. In a centripetal extrusion method employing a centripetal extruder including a melt chamber having an extrusion outlet and a rotary member for imparting rotary motion to a flowable substance for extruding a product from the outlet under centripetal forces, the steps comprising introducing a flowable substance into the melt chamber to be extruded from the outlet by centripetal forces, and continuously introducing into the melt chamber elongated reinforcing members to be spirally swept with the substance to be extruded and ultimately positioned in the extruded product about the longitudinal axis thereof in spiral and substantially uninterrupted condition, the reinforcing members being introduced into the melt chamber in substantially longitudinally extending orientation and uninterrupted condition and being supplied to the melt chamber from a source which is separate from the source of said flowable substance.

4. The process defined in claim 3 wherein the substance to be extruded and the reinforcing members are separately fed into different passages communicating with the melt chamber.

5. The process defined in claim 3 wherein the substance to be extruded and the reinforcing members are fed into the melt chamber through a common passage communicating with the melt chamber.

6. The process defined in claim 5 wherein said common passage extends into the melt chamber generally from the periphery thereof.

7. The process defined in claim 5 wherein said common passage extends into the melt chamber generally laterally thereof.

References Cited

UNITED STATES PATENTS

| | | | |
|---|---|---|---|
| 3,148,412 | 9/1964 | Spreeuwers | 264—349 |
| 3,153,686 | 10/1964 | Adams | 18—12C |
| 3,164,563 | 1/1965 | Maxwell et al. | 260—37 |
| 3,177,272 | 4/1965 | Plymale | 264—176 |
| 3,262,154 | 4/1966 | Valyi | 18—12C |
| 3,303,253 | 2/1967 | Henry | 264—349 |
| 3,122,788 | 3/1964 | Lieberman | 264—176C |
| 3,418,413 | 12/1968 | Henry | 264—176C |

ROBERT F. WHITE, Primary Examiner

G. AUVILLE, Assistant Examiner

U.S. Cl. X.R.

264—176, 349

UNITED STATES PATENT OFFICE
CERTIFICATE OF CORRECTION

Patent No. 3,584,095          Dated June 8, 1971

Inventor(s) James E. Heider and Thomas R. Santelli

It is certified that error appears in the above-identified patent and that said Letters Patent are hereby corrected as shown below:

Column 4, line 40, cancel beginning with "1. A process for" to and including "product material." in column 4, line 55, and insert the following claim:

--1. A process for extruding products and the like while reinforcing the products with elongated reinforcing members and the like arranged about the axis of the products in substantially uninterrupted condition which process comprises; feeding the product material in a centripetal extruder, and continuously feeding the elongated members into the centripetal extruder with the reinforcing members entering the centripetal extruder in substantially longitudinally extending orientation and in uninterrupted condition to be rotated with said product material and ultimately positioned spirally about the longitudinal axis of the product throughout the length of the product, the elongated reinforcing members being supplied to the melt chamber from a source which is separate from the source of the product material.--

Column 4, line 64, should read --from the outlet under centripetal forces; the steps com---.

Signed and sealed this 1st day of August 1972.

(SEAL)
Attest:

EDWARD M. FLETCHER, JR.          ROBERT GOTTSCHALK
Attesting Officer                Commissioner of Patents